S. THOMAS.
GRAPPLE HOOK FOR SKIDDING LOGS.
APPLICATION FILED AUG. 20, 1919.
1,344,320. Patented June 22, 1920.
Inventor
Steve Thomas
By Frank L. A. Hoyt
Attorney

UNITED STATES PATENT OFFICE.

STEVE THOMAS, OF MACCLENNY, FLORIDA.

GRAPPLE-HOOK FOR SKIDDING LOGS.

1,344,320.  Specification of Letters Patent.  Patented June 22, 1920.

Application filed August 20, 1919. Serial No. 318,825.

*To all whom it may concern:*

Be it known that I, STEVE THOMAS, a citizen of the United States, residing at Macclenny, in the county of Baker and State of Florida, have invented certain new and useful Improvements in Grapple-Hooks for Skidding Logs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in grapple hooks for use in connection with skidding logs, ties, etc., and consists of a non-hangable skidder dog especially adapted for dragging logs out of miry places, and affording means to prevent the logs from catching or being hung up, and tending to hold the log or timber in direct line with the cable.

My invention comprises various details of construction, combination and arrangement of parts which will be hereinafter fully described, shown in the accompanying drawings and then specifically defined in the appended claims.

I illustrate my invention in the accompanying drawings which, with the letters of reference marked thereon, form a part of this application, and in which I have shown a perspective view of my device in operation.

Reference now being had to the details of the drawings by letter:

A and B designate hooks pivoted together at C, and loops D are pivotally connected to the end of the shank portion of each hook, and E is a ring connecting said loops and to which a cable F is connected. Pivotally connected to the shank portions of said hooks intermediate their pivotal connection with each other and the pivotal connections between the shank portions of the hooks and the loops D, are the bars H. Said bars are provided for the purpose of warding off any brush which might otherwise come in contact with the end of the log as it is being drawn forward, said bars being adapted to swing against the log near its end at points diametrically opposite.

In operation, the hooks are adapted to grip a log at points opposite in its circumference, while the two members pivoted to the shank portions of the hooks bear against the surface of the log to be hauled, and when the cable is being pulled upon to drag the log forward, the members which are pivoted to the hook will tend to hold the log in direct line with the cable and prevent the log from catching or hanging on stumps, trees or other objects.

By the provision of a device embodying the features of my invention, it will be noted that no necessity is required for the services of axmen for releasing jams, which is necessary where logs are hauled without the attachments which I apply to the hooks.

It will be noted that in the operation of my invention the members which are pivoted to the shank portions of the hook will clamp the log and cause the same to remain in place in whatever way the log may turn.

By the provision of the pivotal members, as set forth, expensive overhead rigging requiring a considerable amount of cable, may be dispensed with, and an appreciable saving in cost for skidding the lumber will be effected.

What I claim to be new is:

A log skidding device comprising two grapple hooks pivoted together, bars pivoted one to each shank portion of a hook and designed to engage a log gripped by the hooks, loops secured to the ends of the shank portions of the hooks, and a ring secured to said loops.

In testimony whereof I hereunto affix my signature.

STEVE THOMAS.